US010649847B2

(12) United States Patent
Sasaki et al.

(10) Patent No.: US 10,649,847 B2
(45) Date of Patent: May 12, 2020

(54) COMMUNICATION APPARATUS, SYSTEM, METHOD, AND NON-TRANSITORY MEDIUM

(71) Applicant: NEC Corporation, Tokyo (JP)

(72) Inventors: Takayuki Sasaki, Tokyo (JP); Adrian Perrig, Zurich (CH); Srdjan Capkun, Zurich (CH); Claudio Soriente, Zurich (CH); Ramya Jayaram Masti, Zurich (CH); Jason Lee, Zurich (CH)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 15/573,033

(22) PCT Filed: May 11, 2015

(86) PCT No.: PCT/JP2015/002389
§ 371 (c)(1),
(2) Date: Nov. 9, 2017

(87) PCT Pub. No.: WO2016/181424
PCT Pub. Date: Nov. 17, 2016

(65) Prior Publication Data
US 2018/0165156 A1  Jun. 14, 2018

(51) Int. Cl.
*G06F 11/14* (2006.01)
*G06F 21/44* (2013.01)
(Continued)

(52) U.S. Cl.
CPC .......... *G06F 11/1402* (2013.01); *G06F 11/14* (2013.01); *G06F 21/44* (2013.01);
(Continued)

(58) Field of Classification Search
CPC combination set(s) only.
See application file for complete search history.

(56) References Cited

U.S. PATENT DOCUMENTS

| 6,185,678 B1 * | 2/2001 | Arbaugh | G06F 21/575 |
| | | | 713/2 |
| 6,335,932 B2 * | 1/2002 | Kadambi | H04L 49/351 |
| | | | 370/391 |

(Continued)

FOREIGN PATENT DOCUMENTS

| WO | WO-2012/105677 A1 | 8/2012 |
| WO | WO-2014/142095 A1 | 9/2014 |

OTHER PUBLICATIONS

Seungwon Shin et al., "Rosemary: A Robust, Secure, and High-performance Network Operating System", CCS'14, 12 pages, copyright 2014.

(Continued)

*Primary Examiner* — Amine Riad
(74) *Attorney, Agent, or Firm* — Wilmer Cutler Pickering Hale and Dorr LLP

(57) ABSTRACT

A communication apparatus comprising: a plurality of communication processes, each performing communication process on a flow associated thereto; a plurality of network interfaces, each of the network interfaces adapted to be connected to a network; a dispatcher that receives a packet from the network interface and dispatches the packet to an associated communication process, based on a dispatch rule that defines association of a flow to a communication process to which the flow is dispatched; and a control unit that performs control to roll back each of the communication processes using saved image thereof.

21 Claims, 19 Drawing Sheets

(51) Int. Cl.
  *H04L 29/06* (2006.01)
  *G06F 21/57* (2013.01)
  *G06F 21/60* (2013.01)
  *H04L 12/747* (2013.01)
  *H04L 12/771* (2013.01)
  *G06F 9/46* (2006.01)
  *G06F 9/52* (2006.01)

(52) U.S. Cl.
  CPC .......... *G06F 21/577* (2013.01); *G06F 21/606* (2013.01); *H04L 29/06755* (2013.01); *H04L 45/56* (2013.01); *H04L 45/742* (2013.01); *H04L 63/12* (2013.01); *G06F 9/461* (2013.01); *G06F 9/52* (2013.01); *G06F 11/1438* (2013.01); *H04L 29/06632* (2013.01)

(56) References Cited

U.S. PATENT DOCUMENTS

| | | | | |
|---|---|---|---|---|
| 7,366,171 | B2* | 4/2008 | Kadambi | H04L 12/46 370/389 |
| 9,800,593 | B2* | 10/2017 | Shimizu | H04L 63/1416 |
| 2003/0016624 | A1* | 1/2003 | Bare | H04L 29/12009 370/217 |
| 2003/0043825 | A1* | 3/2003 | Magnussen | H04L 45/745 370/401 |
| 2008/0151893 | A1* | 6/2008 | Nordmark | H04L 45/00 370/392 |
| 2013/0007754 | A1* | 1/2013 | Chu | G06F 9/4887 718/103 |
| 2013/0019277 | A1* | 1/2013 | Chang | H04L 63/0218 726/1 |
| 2014/0310810 | A1* | 10/2014 | Brueckner | H04L 63/1441 726/23 |
| 2018/0152475 | A1* | 5/2018 | Park | G06N 20/00 |

OTHER PUBLICATIONS

Xitao Wen et al., "Towards a secure controller platform for openflow applications", HotSDN'13, Aug. 16, 2013, 2 pages.
Seungwon Shin et al., "Avant-Guard: scalable and vigilant switch flow management in software-defined networks", CCS'13, 12 pages, copyright 2013.
Openflow Switch Specification Version 1.0.0. (Wire Protocol 0×01), Dec. 31, 2009, 42 pages.
International Search Report corresponding to PCT/JP2015/002389, 3 pages, dated Feb. 8, 2016.
Written Opinion of the International Search Authority corresponding to PCT/JP2015/002389, 5 pages, dated Feb. 8, 2016.
Japanese Office Action issued by the Japan Patent Office for Japanese Application No. 2017-559143 dated Jul. 31, 2018 (7 pages).

* cited by examiner

COMMUNICATION APPARATUS, SYSTEM, METHOD, AND NON-TRANSITORY MEDIUM

CROSS-REFERENCE TO RELATED APPLICATIONS

The present invention is based upon and claims the benefit of the priority of International Application No. PCT/JP2015/002389, entitled COMMUNICATION APPARATUS, SYSTEM, METHOD, AND PROGRAM, filed on May 11, 2015, the disclosure of which is incorporated herein in its entirety by reference thereto.

The present invention relates to a communication apparatus, system, method and non-transitory medium storing a computer program.

BACKGROUND ART

The following outlines OpenFlow, as one example of SDNs (Software Designed Networks) that can dynamically set or change a configuration, function, or performance of a network based on a software. OpenFlow switch includes a flow table including one or more flow entries. Each flow entry includes a match field to be matched with header field information of a received packet, a counter field including statistics information such as the number of received packets and the number of received bytes, and an action field with zero or more actions that dictate how the switch handles a received packet whose header field information matches the match field. Upon reception of a packet, the OpenFlow switch retrieves the flow table thereof using header field information of the packet. In the case of miss-hit (non-match), the OpenFlow switch forwards the packet to OpenFlow controller over a secure channel.

Based upon information on a source and a destination of the packet specified in the header thereof, the OpenFlow controller computes a path for the packet from network topology information. Based upon the path, the OpenFlow controller generates and sets a flow entry for each of OpenFlow switches on the path. On reception of following packets, each having a header matching a match field of the flow entry set by the OpenFlow controller, each of the OpenFlow switches on the path forwards the packets to a next node, for example, as prescribed in the action field of the flow entry. Regarding details of OpenFlow, reference may be made to NPL (Non patent Literature) 4 listed in the below.

There have been extensive research and development efforts on secure networking, especially in SDN (Software Designed Network) to reduce network vulnerabilities to attacks.

In NPL 1 listed in the below, there is proposed ROSEMARY controller, which implements a network application containment and resilience strategy based around the notion of spawning applications independently within micro-NOS (network operating system).

In NPL 2 listed in the below, there is proposed PermOF coping with potential trust issue on OpenFlow applications, in which abuse of trust could lead to various types of attacks impacting an entire network. In PermOF, isolation of control flow and data is established between a controller and applications. OpenFlow applications are isolated from Controller kernel, that is, OpenFlow applications cannot call kernel procedures or directly refer to a kernel memory. There is provided Access control layer between OpenFlow applications and OS (Operating System). The layer is controlled by the Controller kernel, so that undesirable interaction between OpenFlow applications and OS would be cut off.

In NPL 3 listed in the below, there is proposed AVANT-GUARD, a new framework to advance security and resilience of OpenFlow networks with greater involvement from the data-plane layer. Connection migration enables data plane to shield control plane from saturation attacks. Actuating triggers automatically insert flow rules when the network is under attack.

CITATION LIST

Non Patent Literature

[NPL 1]
Seungwon Shin et al., "Rosemary: A Robust, Secure, and High-performance Network Operating System", CCS'14
[NPL 2]
Xitao Wen et al., "Towards a secure controller platform for openflow applications", HotSDN '13
[NPL 3]
Seungwon Shin et al., "AVANT-GUARD: scalable and vigilant switch flow management in software-defined networks", CCS'13
[NPL 4]
"Openflow Switch Specification" Version 1.0.0. (Wire Protocol 0x01), Internet <URL:http://www.openflowswitch.org/documents/openflow-spec-v1.0.0.pdf

SUMMARY

The disclosures of NPLs 1 to 4 given above are hereby incorporated in their entirety by reference into this specification.

The following analysis is made by the inventors of the present invention.

In the related arts such as NPLs 1 to 3, there is not provided any mechanism that enables to recover a contaminated component or process. Thus, once a component or a network node is compromised by a contamination, the contamination may further spread over to an entirety of networks.

Accordingly, it is an object of the invention to provide a system, apparatus, method and non-transitory medium, each enabling recovery from a contaminated state to ensure secure networking.

According to one aspect of the disclosure, there is provided a communication apparatus comprising:

a plurality of communication processes, each performing communication process on a flow associated thereto;

a plurality of network interfaces, each of the network interfaces adapted to be connected to a network;

a dispatcher that receives a packet from the network interface and dispatches the packet to an associated communication process, based on a dispatch rule that defines association of a flow to a communication process to which the flow is dispatched; and a control unit that performs control to roll back each of the communication processes using saved image thereof.

According to another aspect of the disclosure, there is provided a communication system comprising:

a switch;

a controller to control the switch, wherein the switch comprises:

a plurality of switch processes, each of the switch processes performing switch processing on a flow associated thereto;

a plurality of network interfaces, each of the network interfaces connected to a network;

a dispatcher that receives a packet from the network interface and dispatches the packet to an associated switch process, based on a dispatch rule that defines association of a flow to a switch process to which the flow is dispatched, and a control unit that performs control to roll back each of the switch processes using saved image thereof.

According to a further aspect of the disclosure, there is provided a communication method comprising:

dispatching a packet received by a switch to an associated switch process included in the switch, based on a dispatch rule that defines association of a flow to a switch process to which the flow is dispatched;

the associated switch process performing switch processing on a flow associated thereto; and performing control to roll back each of the switch processes using saved image thereof.

According to still another aspect of the disclosure, there is provided a non-transitory computer-readable recording medium storing therein a program to be executed by a computer, the program causing the computer to execute processes comprising:

a plurality of communication processes, each of the communication processes performing communication processing on a flow associated thereto;

a dispatching process that receives a packet from the network interface and dispatches the packet to an associated communication process, based on a dispatch rule that defines association of a flow to a communication process to which the flow is dispatched; and a rollback process that performs rollback of each of the communication processes using saved image thereof.

According to the present invention, networking process in enabled to recover from a contamination to ensure secure networking.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
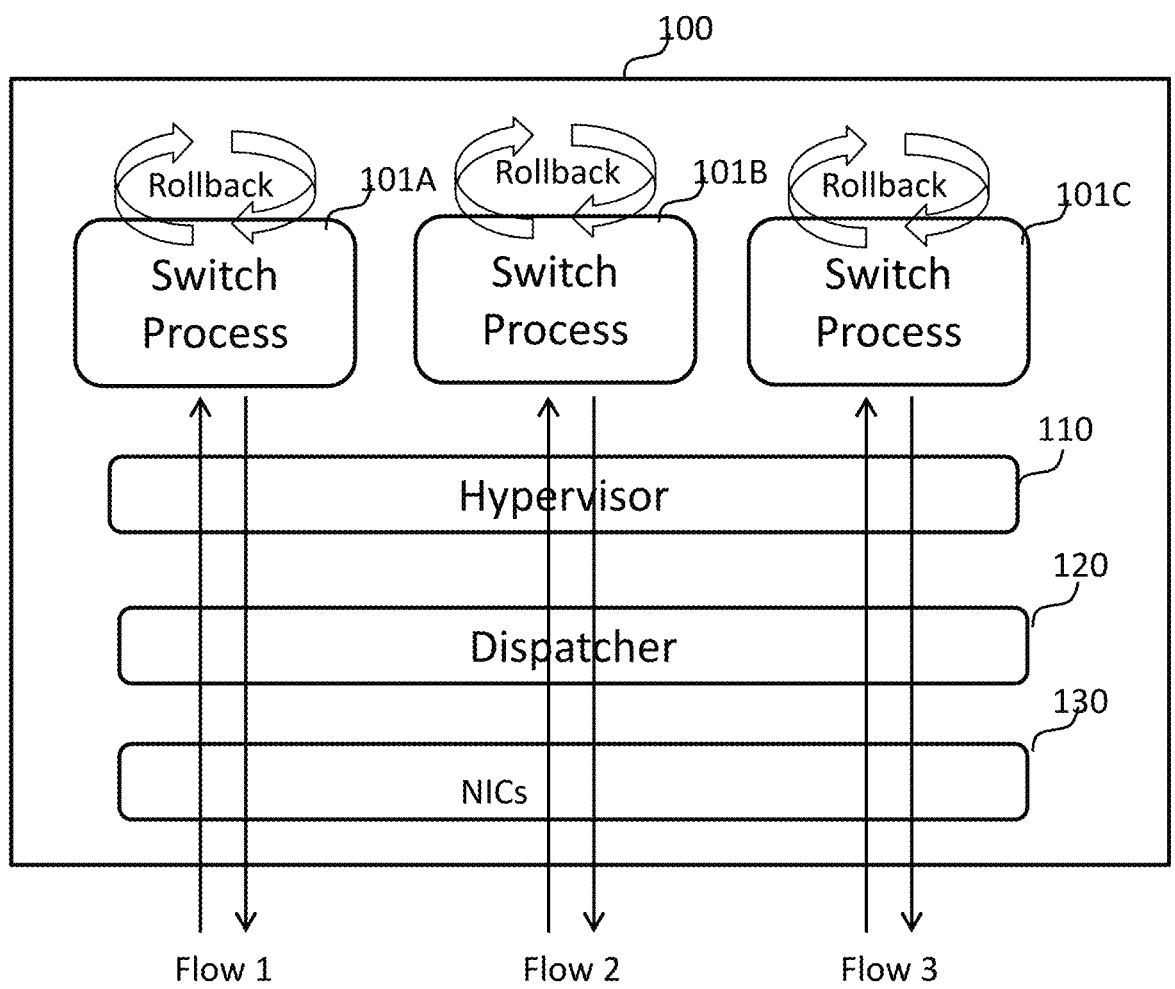
FIG. 1 is a diagram illustrating a configuration of a switch in an exemplary embodiment of the present invention.

The following describes exemplary embodiments of the present invention. FIG. 1 illustrates a switch in an exemplary embodiment. Referring to FIG. 1, there is provided a switch 100 that includes switch processes 101 (101A-101C), a hypervisor 110, a dispatcher 120, and network interface controllers (or network interface cards) (NICs) 130.

The dispatcher 120, arranged between NICs 130 and switch processes 101 (101A-101C), dispatches a flow (a packet received from one of NICs 130) via the hypervisor 110 to an associated switch process 101. The dispatcher 120 also dispatches a packet received from a switch process 101 to a corresponding one of the NICs 130 for output of the packet to a network. The dispatcher 120 may include a plurality of input ports (not shown), and a plurality of output ports (not shown), and forwards a packet received at an input port thereof to a target output port thereof, based on a dispatch rule that defines a correspondence between a flow and a switch process associated with the flow. The dispatcher 120 may be configured by a hardware switch with a controller, or by a virtual switch implemented by software. A flow may be defined by predetermined header fields of a packet, for example, one or a combination of source interface, protocol, source IP address, source port, a destination IP address, and destination port.

The hypervisor 110 provides creates a switch process. In FIG. 1, it is only for the sake of illustration that there are provided three switch process 101A-101C. The number of switch processes is not, as a matter of course, limited to three and may be any integer not less than one.

The hypervisor 110 may include a computer software, firmware or hardware and adapted to control hardware resources. Though not limited thereto, when applied to server virtualization, the hypervisor 110 may control a virtual machine (VM) including: virtualized hardware resources a guest OS and an application, wherein the virtualized hardware resources include virtualized CPU (Central Processing Unit), a virtualized storage, and a virtualized network, for example.

In this exemplary embodiment, control is performed such that a process image of the switch process 101 is saved in a storage not shown, and also integrity measure such as Hash value or CheckSum of contents related with the switch process 101 is logged in correspondence with the saved process image, and then after the integrity measure of contents related to the switch process 101A is calculated again and integrity verification is performed by checking whether the currently calculated integrity measure and the integrity measure previously calculated and saved are the same. When it is found that the currently calculated integrity measure and the integrity measure previously calculated and saved are not the same, the saved process image of the switch process 101A is restored. Thus, the process image of the switch process 101A is rolled back to that at the time before the contents related to the switch process 101A gets corrupted.

In the switch 100, the hypervisor 110 may include a rollback control function adapted to control execution of saving of the process image, integrity verification, and restoration of the saved process image to a target process.

The hypervisor 110 may control rollback of the switch process 101, for example after handling one flow or N flows, where N is a positive integer not less than 2, or periodically.

According to the embodiment described with reference to FIG. 1, even when a switch process 101 is compromised by a contamination, the contamination can be removed by rollback to contribute to a secure networking.

Figure 2:
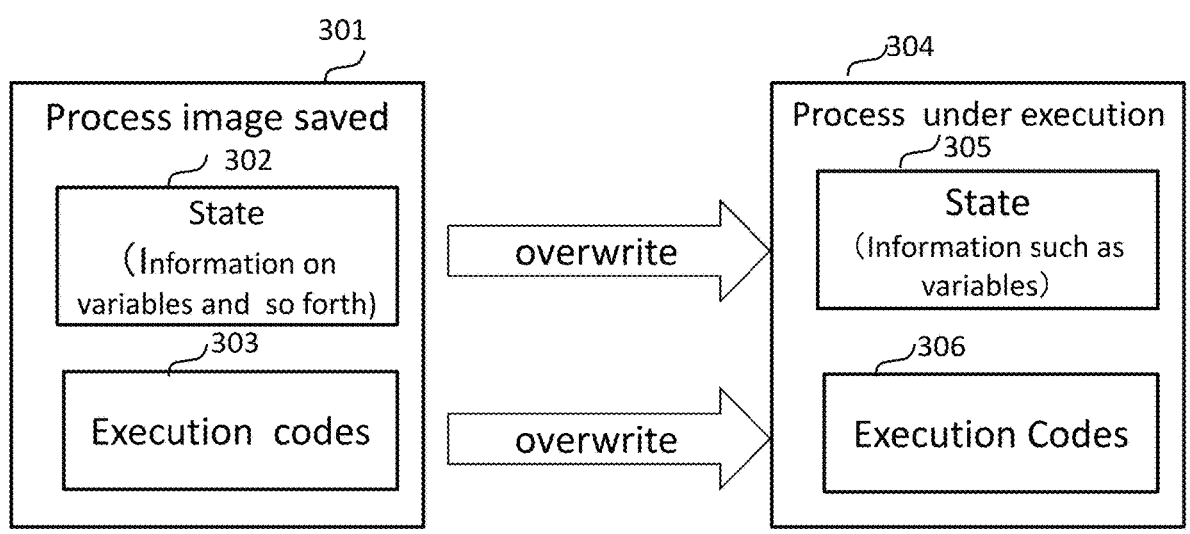
FIG. 2 is a diagram illustrating roll back in the exemplary embodiment of the present invention.

As illustrated in FIG. 2, for a rollback operation, the process image saved 301 may include execution codes of the process (e.g., instruction codes on a main memory allocated to the process) and a state (e.g., information of variables, registers, stack pointer, and tables allocated for the process). The state of the switch process 101 may include a flow table later described.

Contents to be rolled back include three types as follows:
(a) the saved state is restored;
(b) the saved execution codes are restored; and
(c) the saved state and saved execution codes are restored.

More specifically, as illustrated in FIG. 2, the saved state 302 is overwritten to the existing state 305 of the switch process under execution, or the execution codes 303 are overwritten to the execution codes 306 of the switch process under execution, or the saved state 302 and the execution codes 303 are overwritten to the existing state 305 and execution codes 306 of the switch process under execution, respectively.

This configuration contributes to the acceleration or speed up of recovery process by the roll back operation, as compared with rollback-shutdown-rebooting operation. In restoring the saved state 302 and/or the execution codes 303 to the switch process under execution, control such as mutual exclusion and synchronization, as a matter of course, is performed for the switch process under execution.

Figure 3:
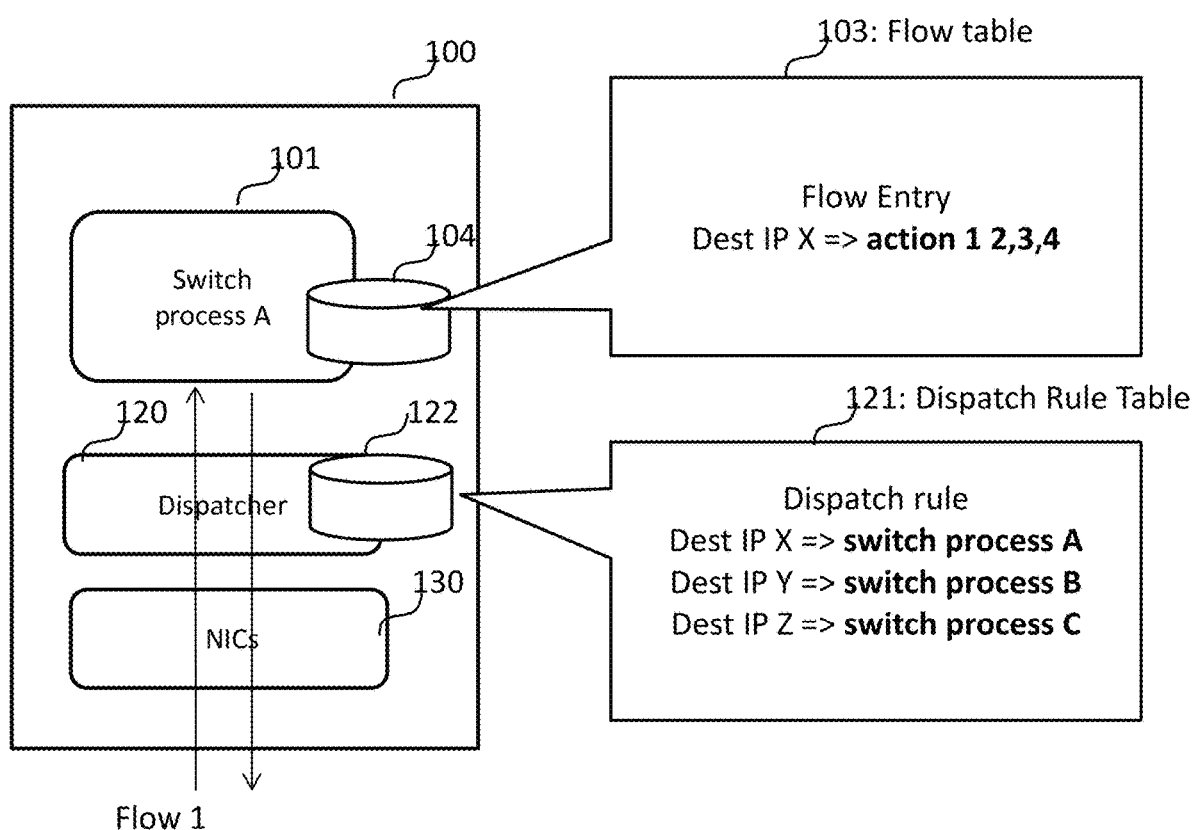
FIG. 3 is a diagram illustrating an example of a sequence of the switch in the exemplary embodiment of the present invention.
Figure 4:
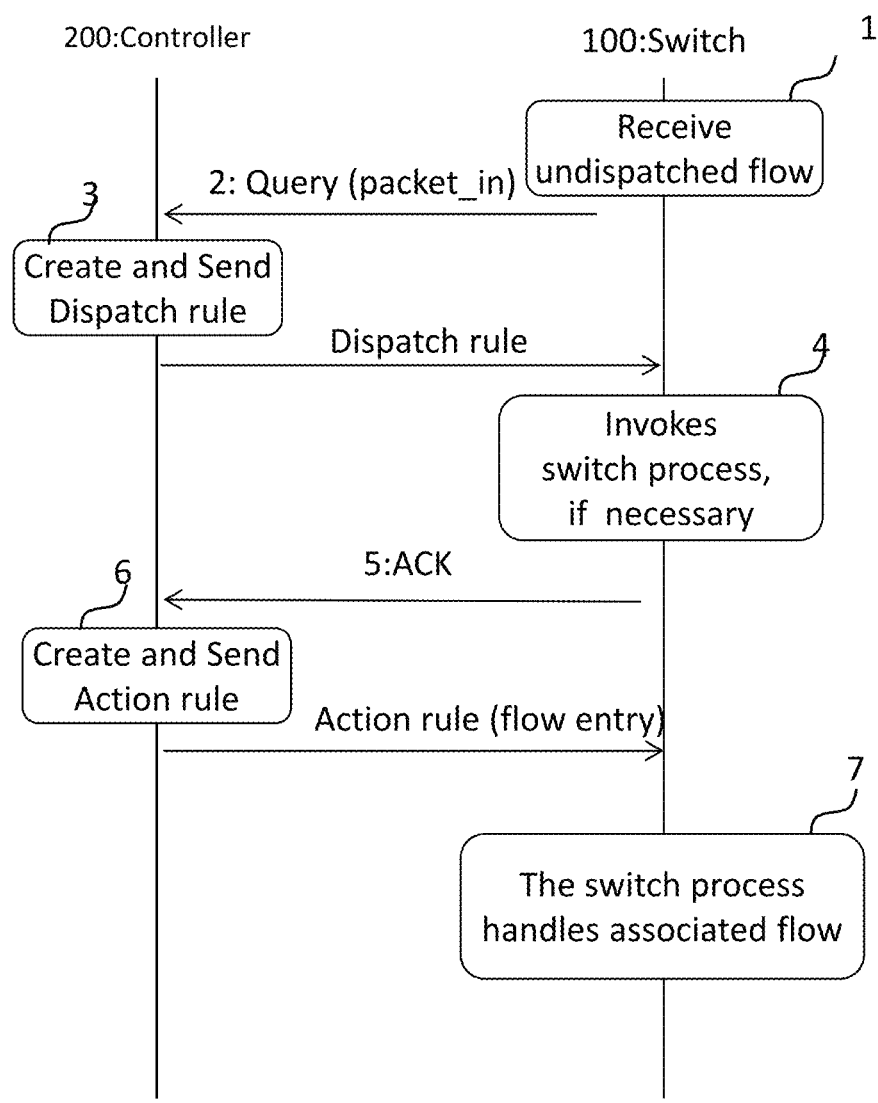
FIG. 4 is a diagram illustrating a variation of the switch in the exemplary embodiment of the present invention.

The following describes configuration and operation of the switch 100 with reference to FIGS. 3 and 4.

FIG. 3 illustrates dispatch rules in the dispatcher 120 and the flow entry in the switch process 101 in the switch 100. The dispatcher 120 includes a dispatch rule table 121 that is stored in a storage 122. The dispatch rule table 121 includes one or more dispatch rules, each of which specifies an association of a flow with a switch process to which the flow is dispatched. It is noted that in FIG. 3, only for the sake of simplicity, a flow field (condition field) in the dispatch rule table 121 uses only a destination IP address field, but one or more other fields of a packet header such as MAC address and VLAN ID may be used to define a flow.

The dispatcher 120 performs analysis of an IP header of a received IP packet to extract a destination IP address field of the IP header and retrieves the dispatch rule table 121 to find a dispatch rule with a flow field that matches the destination IP address. In the example in FIG. 3, the dispatch rule table 121 includes three dispatch rule stating respectively as follows:

if a destination IP address field of a received packet header is X, then packet is dispatched to a switch process A, if a destination IP address field of a received packet header is Y, then packet is dispatched to a switch process B, and if a destination IP address field of a received packet header is Z, then packet is dispatched to a switch process C. In this example, the dispatcher 120 dispatches a received IP packet with destination IP address: X to the switch process A.

Each switch process 101 includes a flow table 103 including one or more flow entries, stored in a storage 104. Each flow entry in the flow table 103 includes at least a match field and an action field including a list of actions. The switch process 101 retrieves the flow table 103 using IP header field information of the received IP packet. In this example, finding that the destination IP address X of the IP packet header dispatched to the switch process A by the dispatcher 120 matches a match filed of the flow entry, the switch process A executes actions 1, 2, 3 and 4, as prescribed in the action field of the matching flow entry in the flow table 103.

FIG. 4 schematically illustrates a flow setup sequence in the switch 100 described with reference to FIG. 3.

Referring to FIG. 4, the switch 100 receives an un-dispatched flow (1). The number 1 in the parentheses denotes a sequence number 1 in FIG. 4. The same maybe said of the following sequences. The un-dispatched flow is a flow (a new flow) to which no switch process corresponding the flow is not yet assigned (present) in the dispatch rule table 121, resulting in no-match.

The switch 100 sends a query to the controller 200 (2).

The query sent from the switch 100 to the controller 200 may include at least a packet header of the captured packet in order to inform the controller 200 of the flow information. Though there is no specific limitation, the switch 100 may send, as the query, for example, a Packet-In message via a secure channel to the controller 200, using the OpenFlow protocol. The Packet-In message includes a reason field indicating why the packet has been captured and forwarded to the controller and the captured portion of the packet (first packet). In this case, the reason field in the Packet-In message may include a code indicating no-match in the dispatch rule table 121 in the switch 100.

On reception of the query from the switch 100, the controller 200 analyzes the IP packet header of the packet (first packet) included in the query and creates a dispatch rule for the new flow.

In this stage, in the controller 200, there is a case wherein there is not yet assigned any controller process associated with a new flow, wherein the controller process will be described herein after with reference to FIG. 5. In such a case, a predetermined default controller process may analyze the IP packet header of the first packet and creates a dispatch rule for the new flow. The controller 200 sends the created dispatch rule to the switch (3).

The switch 100 receives the dispatch rule for the new flow from the controller 200 and updates the dispatch rule table 121 with the dispatch rule for the new flow. The hypervisor 110 in the switch 100 invokes a switch process 101. In the case wherein the switch process 101 defined in the dispatch rule received from the controller 200, has been already invoked but has not yet been associated with the new flow (e.g., Destination IP address: X), invocation of the switch process 101 (e.g., "process A") may be omitted.

The switch 100 then sends an acknowledgement response (ACK) to the controller 200 (5).

The controller 200, responsive to the ACK from the switch 100, calculates a new path, based on network topology information stored in a storage provided in the controller 200, and then creates and sends an action rule (flow entry) to the switch 100 and one or more other switches not shown on the path (6). The controller 200, as an OpenFlow controller, may send a FlowMod (Flow Modify) message including actions specifying what actions should be taken for matching packets, or match and instructions, to each of the switch 100 on the path.

The switch process 101 updates a flow table 103 thereof with a rule (flow entry) sent from the controller 200 in the storage 104. The switch process 101 handles packets, following the first packet and belonging to the same flow as the first packet, according to the flow entry received from the controller (7). The controller 200 may send the first packet to an edge switch of the OpenFlow network using Packet out message and the first packet may be transmitted to the destination node from the edge switch.

When a predetermined time elapses from a time when the flow entry is set up or from a last time the flow entry is referenced, wherein the predetermined time may be specified in a flow entry, a flow entry is removed in the switch and a Flow Removed message is sent from the switch to the controller using OpenFlow protocol. This corresponds to a termination of a flow. That is, from setup of a flow entry in the flow table 103 in the switch to removal of the flow in the switch define one life cycle of the flow.

The following describes the controller 200 in FIG. 4.

Figure 5:
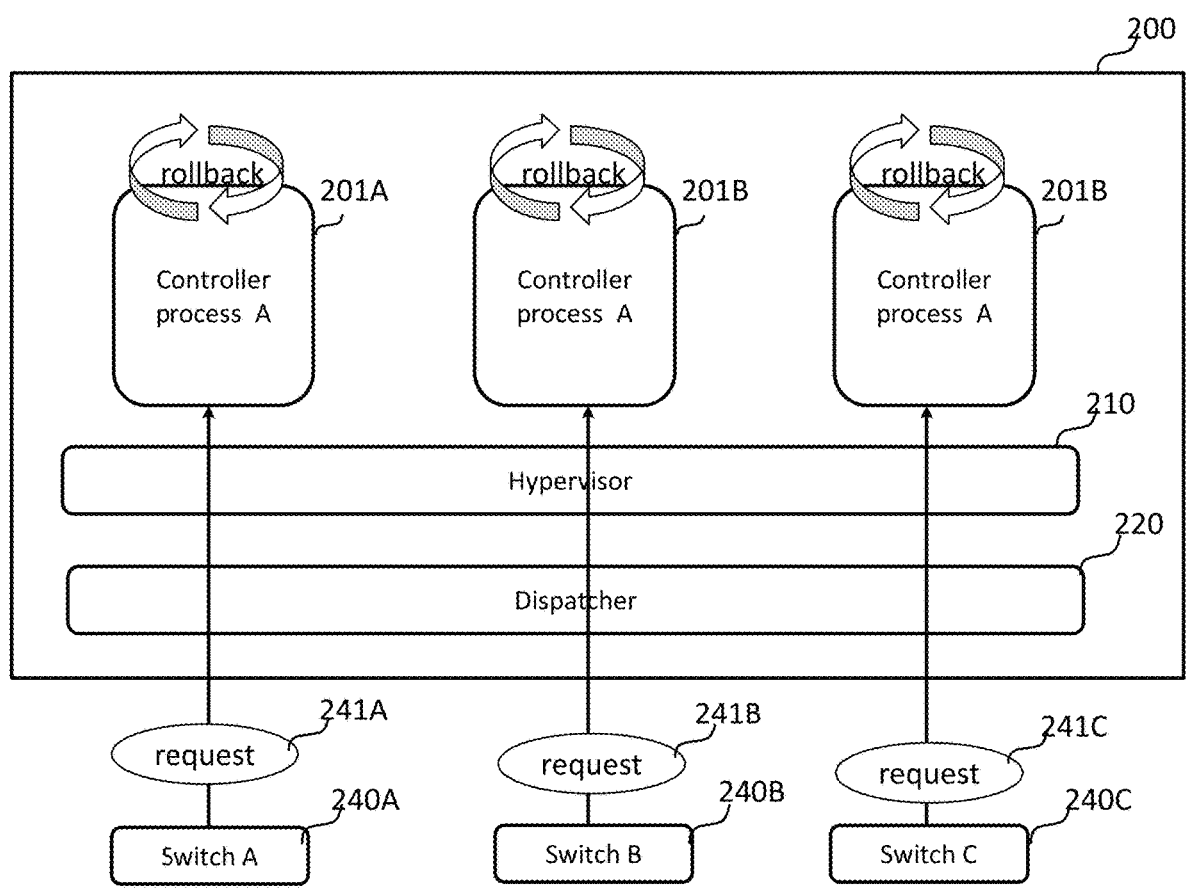
FIG. 5 is a diagram illustrating a configuration of a controller in the exemplary embodiment of the present invention.

FIG. 5 is a diagram illustrating the controller 200 in the exemplary embodiment. Referring to FIG. 5, a hypervisor 210 controls creation/termination of each of controller processes 201 (201A-201C). In FIG. 5, there are provided, only for the sake of illustration, three controller processes 201A-201C. The number of the controller processes 201 is not, as a matter of course, limited to three, and may be any integer not less than one.

Dispatcher 220 receives a request (such as Packet-In message) from a switch 100 (or switch process 101) and dispatches the request to an associated controller process 201, based on a dispatch rule. The dispatch rule in the dispatcher 220 may include a correspondence between a port ID that is connected to a switch and a controller process ID. The correspondence between a port ID connected to a switch and a controller process ID may be determined based on a trust level of the controller process and the switch. The correspondence also may be determined on the basis of virtual network. For example a controller process that controls virtual network A and switch processes that handles traffic of network A are connected.

The hypervisor 210 includes a rollback control function of saving of the process image, integrity verification, and restoration of the process image. This rollback control function of the hypervisor 210 corresponds to that of the hypervisor 110 in the switch 100 described above.

The hypervisor 210 controls rollback of each of the controller processes 201A-201C, for example after processing a request from the switch 100 (or after handling a flow (or N flows)). The hypervisor 210 also may perform rollback periodically, for example per-hour and per-day. According to this embodiment, even when a controller process is compromised by a contamination, it is made possible to recover of the controller process by removing the contamination by rollback.

The process image of the controller process 201 includes execution codes and state (information of variables, registers, and tables allocated for the process). The state of the controller process may include network topology information.

As described with reference to FIG. 2, regarding the rollback of the switch process 101, the rollback for the controller process 201 also includes three types as follows: (a) the saved state is restored, (b) the saved execution codes are restored, and (c) the saved state and saved execution codes are restored. As shown in FIG. 2, the saved state and/or execution codes are overwritten to the existing state and/or execution codes of the controller process 201 under execution. This configuration contributes to the acceleration or speed up of recovery process by the roll back operation, as compared with rollback-shutdown-rebooting operation. In restoring the saved state 302 and/or the execution codes 303 to the controller process 201 under execution, control such as mutual exclusion and synchronization, is, as a matter of course, is performed of the controller process 201 under execution.

Figure 6:
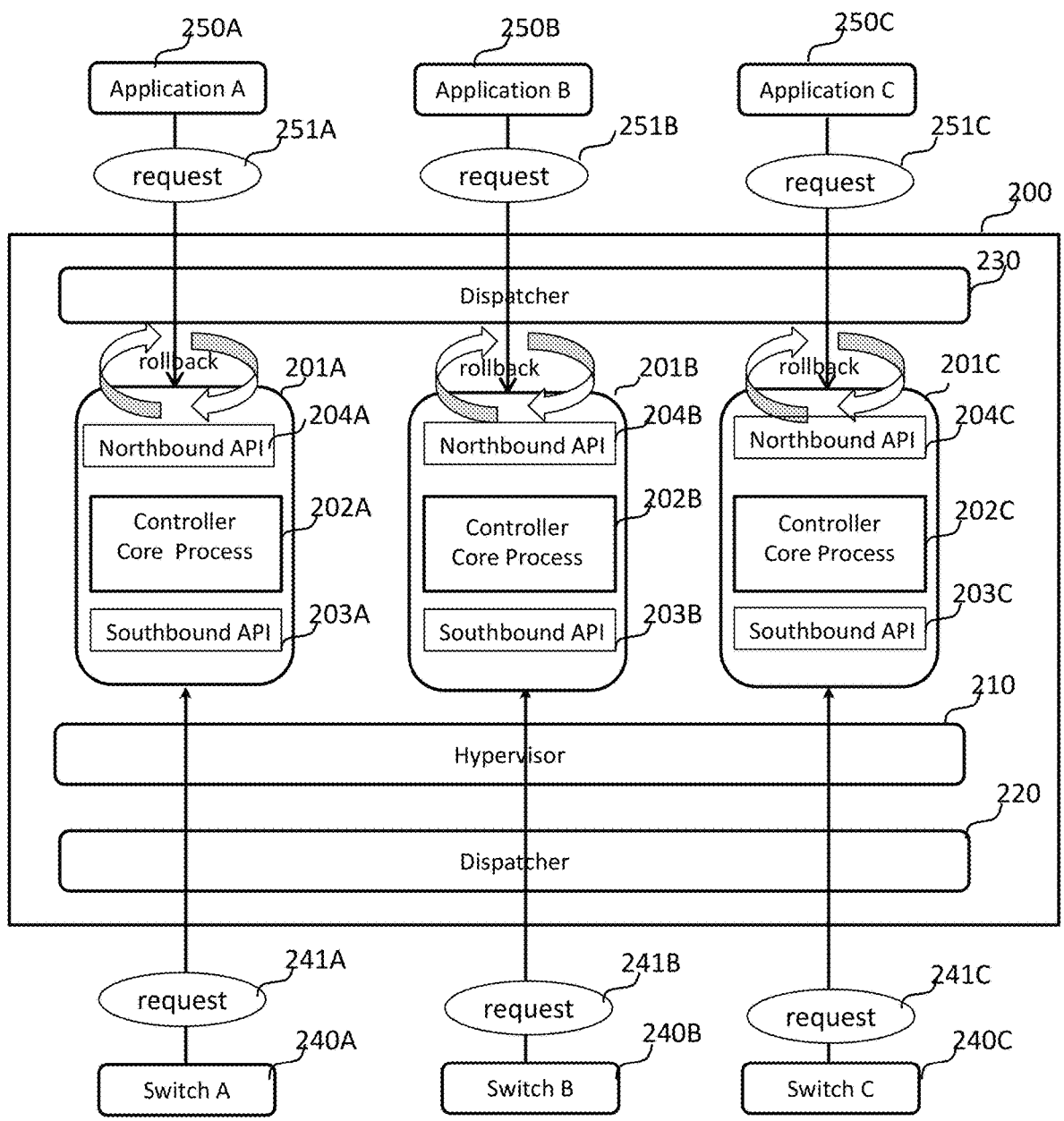
FIG. 6 is a diagram illustrating a variation of a controller in the exemplary embodiment of the present invention.

FIG. 6 is a diagram illustrating a variation of the controller 200. Referring to FIG. 6, controller processes 201A-202C are invoked by a hypervisor 210.

Dispatcher 220 (Dispatcher for southbound API) dispatches a request (API (Application Program Interface) call) from a switch 100 (or switch process in the switch) to an associated Southbound API 203 and controller process 201. The request (API call) sent from the Dispatcher 220 is forwarded via Southbound API 203 to a controller core process (core function) 202.

Dispatcher 230 (Dispatcher for northbound API) dispatches a request 251 (API call) from an application 250 (e.g., Loadbalancer, Firewall and so forth) to an associated Northbound API 204. The request (API call) from the Dispatcher 220 is forwarded via Northbound API 204 to the controller core process 201.

The southbound APIs 203A-203C allow the controller processes 201A-201C to define the behavior of switches at the bottom of the SDN stack. The northbound APIs 204A-204C specify communication interface between the controller processes 201A-201C and the applications 205A-205C or higher layer control programs, at the top of the SDN stack. It is noted that the applications 205A-205C are also called northbound applications.

In this example, the dispatchers 220 and 230 may dispatch API calls on the basis of "tenant", though not limited thereto.

The hypervisor 210 controls rollback of the controller process for example after processing a request such as a Packet-In message from the switch 100 or the application 250, or after handling a flow (or N flows). In this example, even when a controller process is compromised, contamination can be removed by rolling back to process image not contaminated.

The process image includes execution codes and/or state (information of variables, registers, and tables allocated for the process). The state of the controller process 201 may include network topology information, though not limited thereto. In this example, the roll back includes, as same as the controller 200 described with reference to FIG. 5, three types as follows: (a) the saved state is restored, (b) the saved execution codes are restored, and (c) the saved state and saved execution codes are restored. As shown in FIG. 2, the saved state and/or execution codes are overwritten to the existing state and/or execution codes of the controller process under execution.

Figure 7:
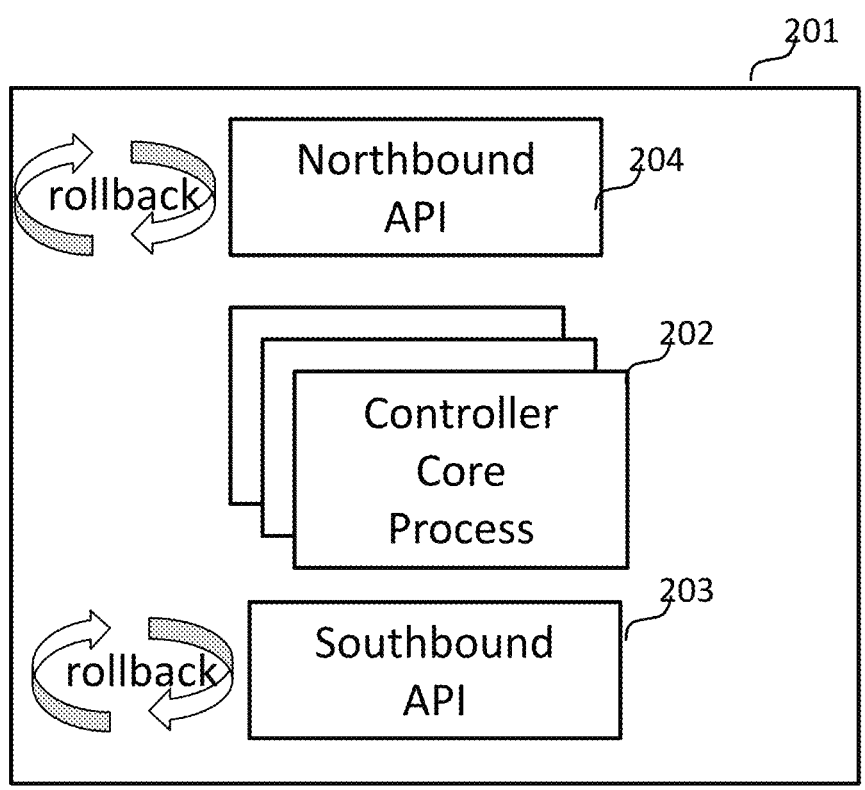
FIG. 7 is a diagram illustrating a variation of the roll back in the controller in the exemplary embodiment of the present invention.

FIG. 7 illustrates a variation of rollback of the controller process 201 in FIG. 6. As schematically illustrated in FIG. 7, a part of the controller process 201 may be rolled backed separately, such as Southbound API 203, or Northbound API 204 arranged in outer sides of the controller core process 202. Southbound API 203 or Northbound API 204 arranged on an outer side is apt to be more exposed to contamination from outside (network or application) than controller core process 202 arranged in an inner side. Therefore, roll back of Southbound API 203 or Northbound API 204 may be performed more frequently as compared to the controller core process 202.

The rollback may be performed, when the controller process 201 executes a network topology discovery, that is, after handling one operation. Alternatively, the rollback of controller core process 202 may be performed periodically.

Rollback timing may be varied on a basis of security level. For example, one or more controller processes 201 that handle important flows may be saved and verified at a relatively short interval and other controller process may be saved and verified at a relatively long interval.

Figure 8:
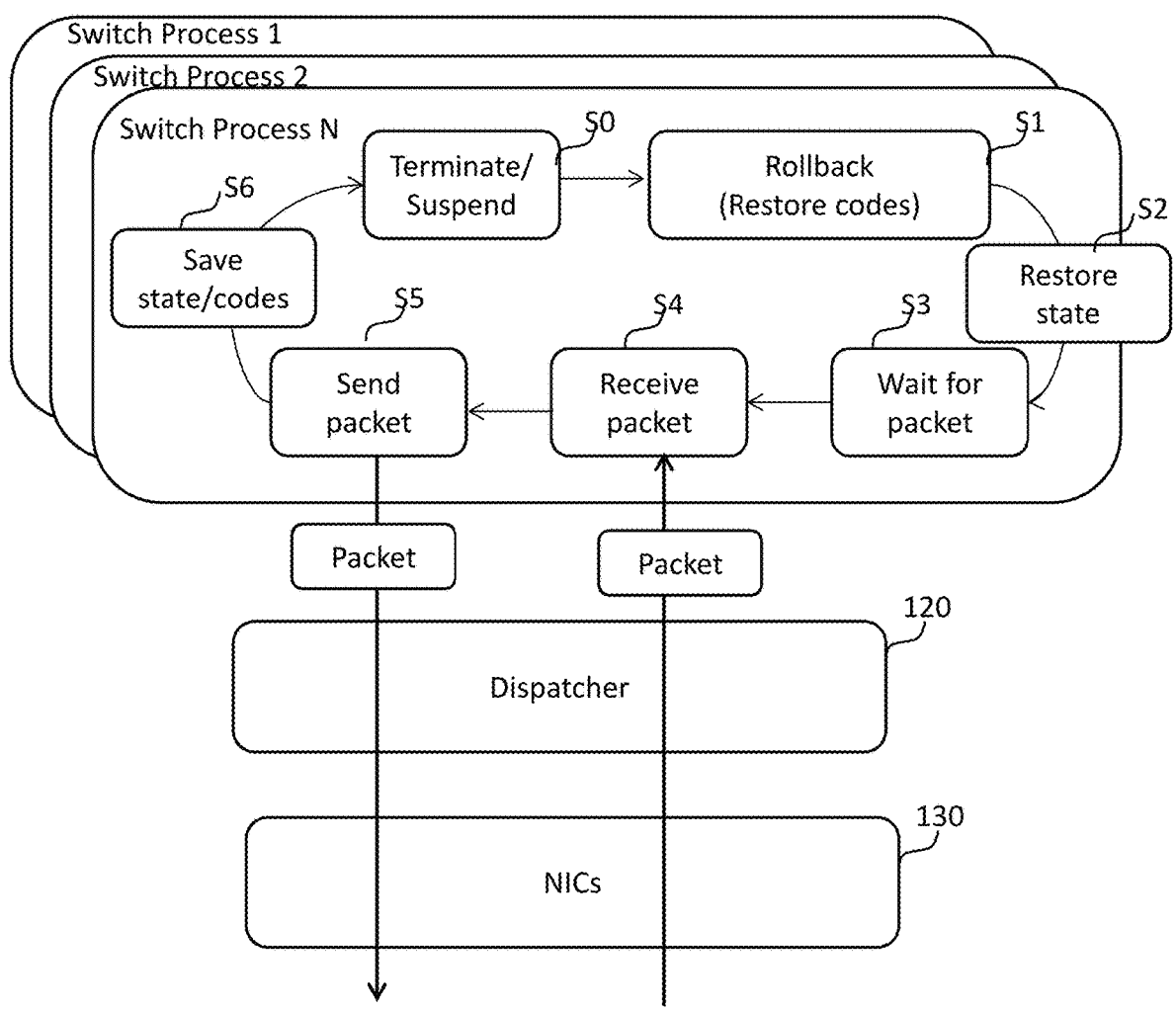
FIG. 8 is a diagram illustrating a rollback sequence in the switch process in the exemplary embodiment of the present invention.

FIG. 8 illustrates a process lifecycle of the switch process 100 in FIG. 1. The switch process N that has been terminated or suspended (S0) is rolled back (saved execution codes are restored) by the hypervisor 110 (S1). Then, saved state is restored (S2).

The switch process N waits for a packet (S3). When the switch process N receives a packet, the switch process N retrieves a flow table to find a flow entry that matches packet header information of the received packet. The switch process N handles the received packet according to an action field of the matching flow entry. In this case, the switch process N forwards the packet to a next node. The state, or the flow table of the switch process N is saved and execution codes of the switch process N are saved (S6). The switch process N is terminated or suspended (S0). Other switch processes 1-N-1 are also controlled in the same way as the switch processes N.

Figure 9:
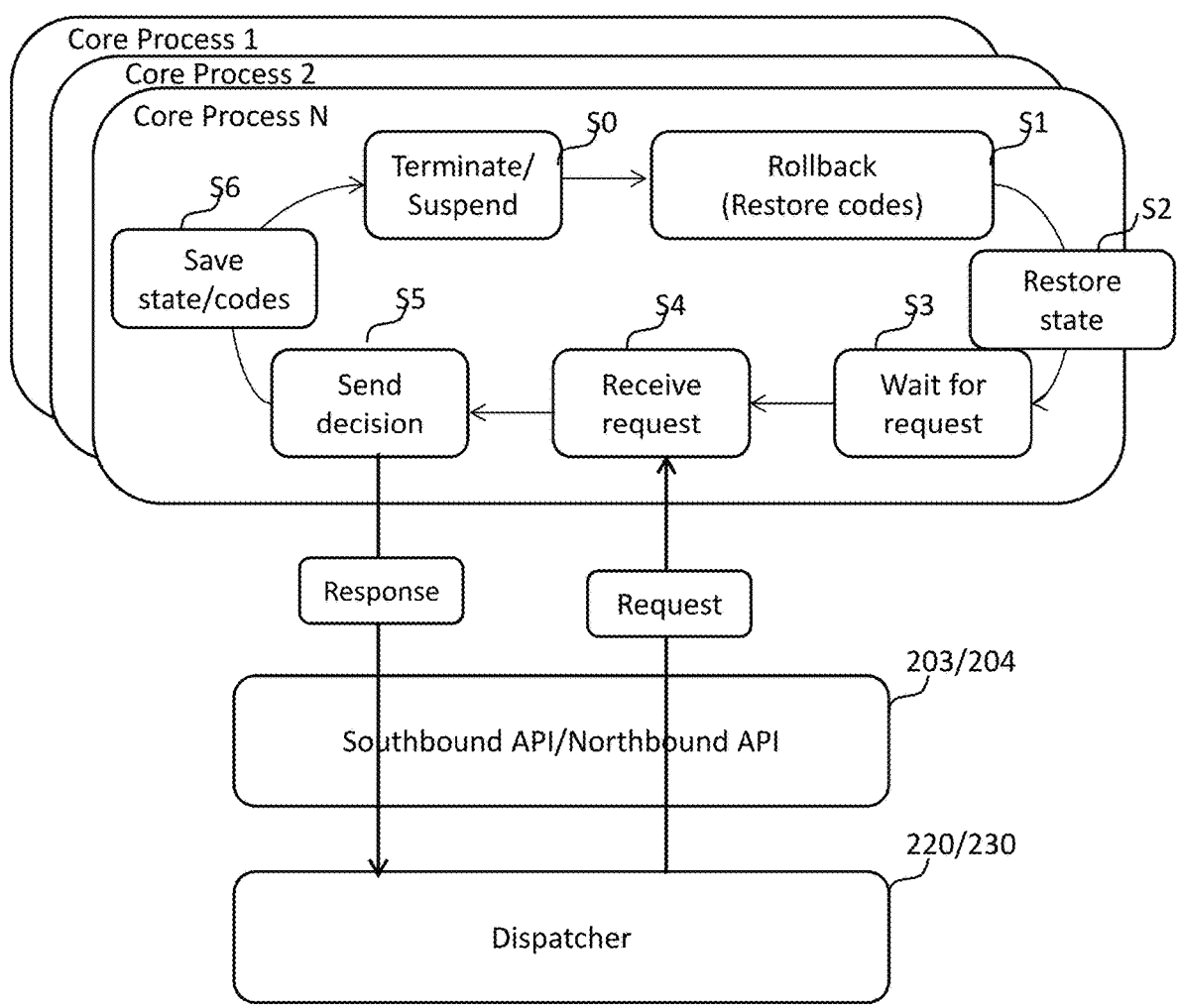
FIG. 9 is a diagram illustrating a rollback sequence in the controller process in the exemplary embodiment of the present invention.

FIG. 9 illustrates a process lifecycle of the controller process 201 in FIG. 6. The controller process (controller core process) N that has been terminated or suspended (S0) and saved execution codes are rolled back by the hypervisor 110 (S1). Saved state is restored (S2). The controller process (controller core process) N waits for a request from Southbound/Northbound API (S3). When the controller process (controller core process) N receives a request (S4) from the Southbound/Northbound API, the controller process (controller core process) N sends a decision (response) to the Southbound/Northbound API. The state, or the topology information is saved and execution codes of the controller process (controller core process) N are saved (S6). The controller process (controller core process) N is terminated or suspended (S0).

The following describes a variation of rollback control in the exemplary embodiment, wherein integrity verification of a rollback image to be restored is performed.

Figure 10A:
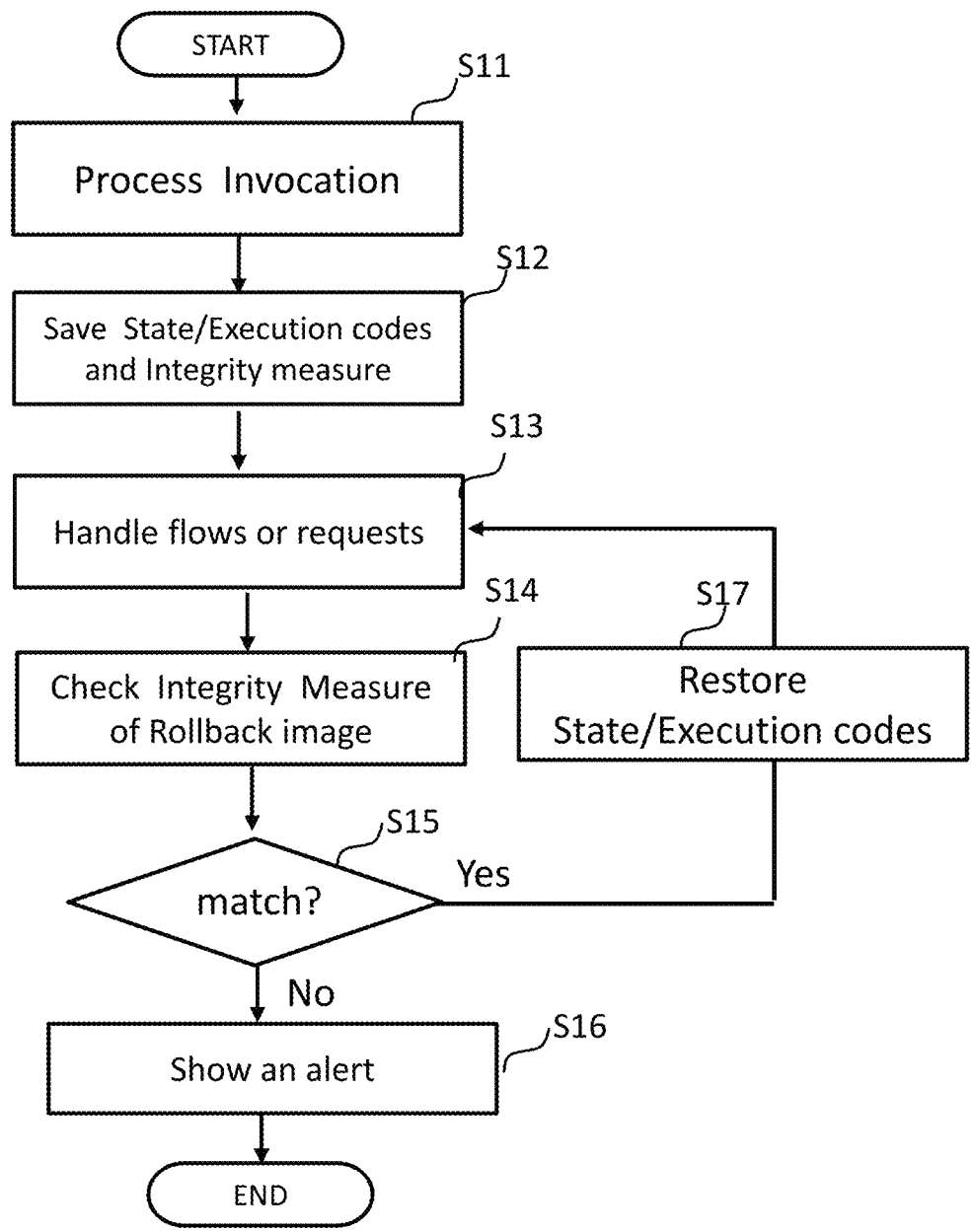
FIG. 10A is a diagram illustrating a procedure of a variation of rollback in the exemplary embodiment.

FIG. 10A illustrates a procedure of a variation of the rollback control in the exemplary embodiment. The procedure in FIG. 10A can be applied to rollback control both in the switch 100 and the controller 200.

Process (switch process 101/controller process 201) is invoked by a hypervisor (110/210) (S11).

The state/execution codes are saved and integrity measure such as a hash value is saved with a control by the hypervisor (110/210) (S12).

The controller handles requests or the switch handles flows (S13).

Integrity measure of the rollback image is calculated and compared with the saved integrity measure at S12 (S14).

If the current calculated integrity measure does not match the saved integrity measure (No branch of S15; it means the rollback image is modified), the hypervisor (110/210) shows an alert (S16). If the rollback image is not modified, the process is recovered using the rollback image (S17).

In the above embodiment, the hypervisor (110/210) may periodically perform rollback. Alternatively, the hypervisor (110/210) may perform rollback when a predetermined event occurs. For example, the hypervisor (110/210) may measure integrity of each running process. In case that the hypervisor (110/210) identifies compromise, the hypervisor (110/210) may perform rollback. Further alternatively, hypervisor (110/210) may monitor behavior of each process and rollback a process that is found to perform abnormal operations.

Figure 10B:
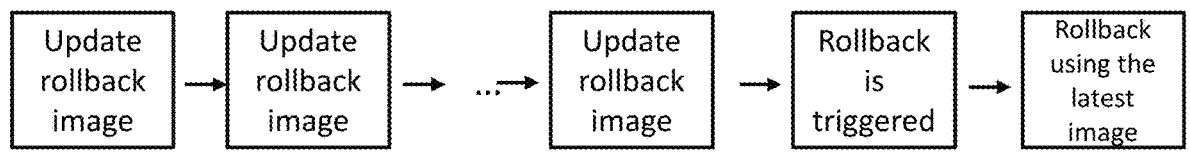
FIG. 10B is a diagram illustrating a variation of roll back in the exemplary embodiment.

FIG. 10B illustrates a variation of rollback image management. In the above, the hypervisor 210 saves the rollback image once when the hypervisor invokes a process, but the hypervisor 210 may save the rollback image periodically. For example, the hypervisor 210 saves/updates the rollback image at 10 minute interval, though not limited thereto. On occurrence of a predetermined event for triggering rollback (e.g., integrity check failure of running process, finding abnormal behavior and so forth), the hypervisor (110/210) rolls back the process using latest rollback image.

In the case wherein the rollback image includes a flow entry of the switch process 101, the flow entry saved as the rollback image is overwritten to a current (existing) flow entry of the switch process 101. In this case, the switch process 101 may send a message requesting for a flow entry to a controller and obtain the current flow entry. Alternatively, the switch process 101 may save a current flow entry thereof as a replica in a storage that is not overwritten by the restoration of the rollback image, and after the roll back is completed, the switch process 101 may restore the current flow entry using from the replica saved. The same may be said with regard to a state in the rollback image of the controller process 201.

Figure 11:
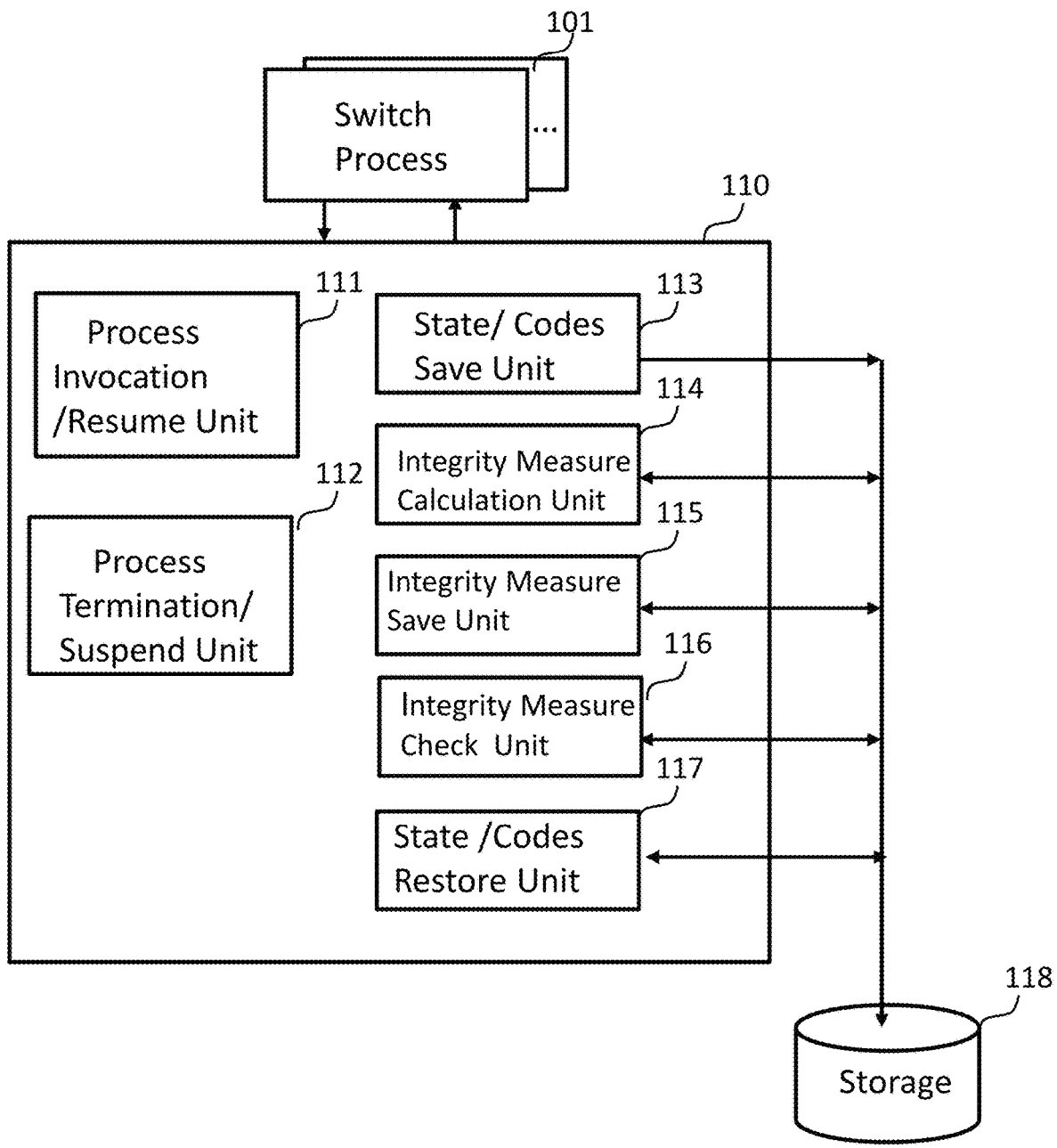
FIG. 11 is a diagram illustrating a hypervisor in the in the exemplary embodiment of the present invention.

The following describes an example of a hypervisor 110 in the switch 100. FIG. 11 illustrates a configuration of a hypervisor 110 as a rollback controller in the switch 100. In FIG. 11, elements in the hypervisor 110 related to rollback control are schematically illustrated and other elements in the hypervisor 110 are omitted.

Referring to FIG. 11, process invocation/resume unit 111 invokes (reboots) or resumes a switch process 101. Process termination/suspend unit 112 terminates or suspends the switch process 101. The process invocation/resume unit 111 resumes a suspended switch process 101, that is, releases suspended state of the switch process 101. State/Codes save unit 113 saves State and/or Execution Codes of the switch process in a storage 118. Integrity measure calculation unit 114 calculates an integrity measure that may include a hash value, of contents of the switch process 101. Integrity measure save unit 115 saves an integrity measure currently calculated by Integrity measure calculation unit 114. Integrity measure check unit 116 checks whether or not an integrity measure currently calculated by Integrity measure calculation unit 114 and a previously calculated and saved integrity measure are the same.

State/Codes restore unit 117 overwrites the state and/or execution codes saved to the state and/or execution codes as described with reference to FIG. 2. The rollback controller functions may well be implemented by a computer program. The hypervisor 210 in FIG. 5 and FIG. 6 may also be configured, with regard to rollback control of the controller process, in the same way as described with reference to FIG. 11.

Figure 12:
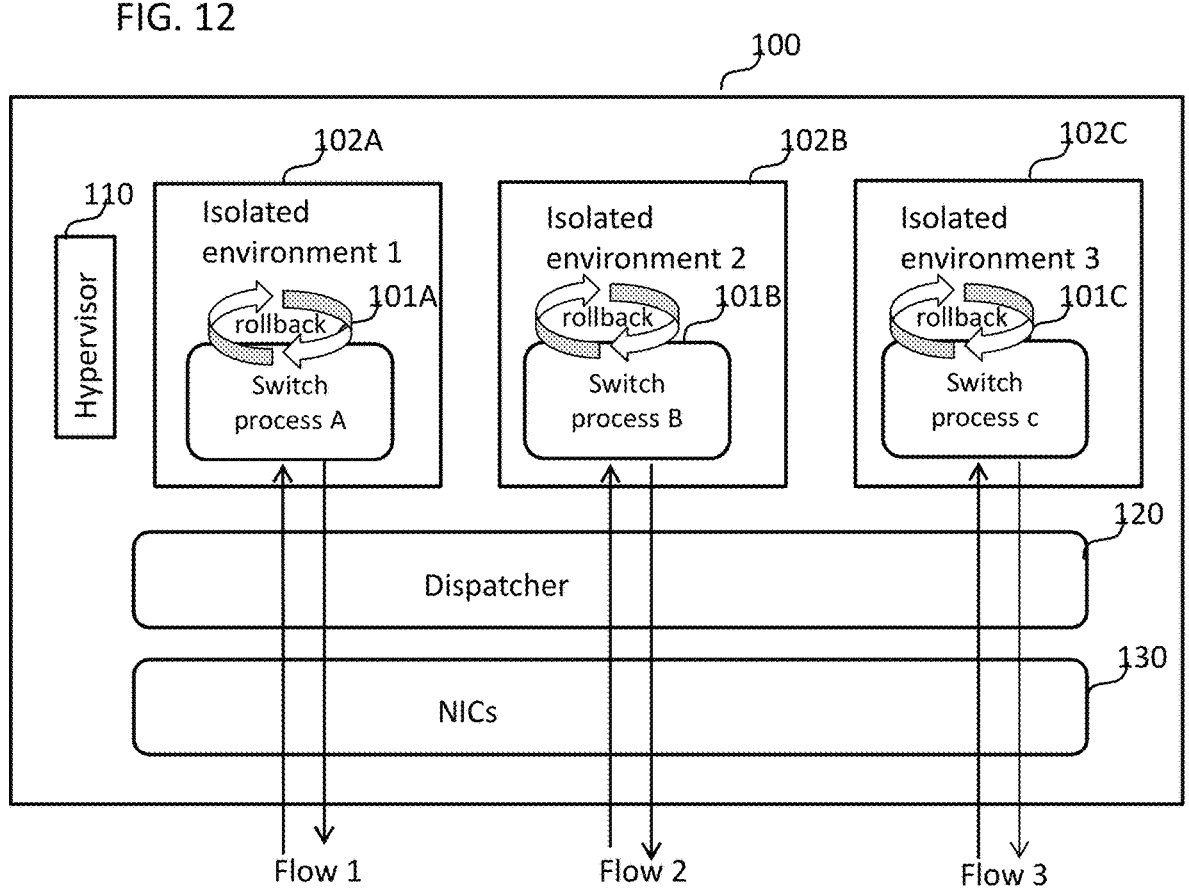
FIG. 12 is a diagram illustrating a configuration of a switch in another exemplary embodiment of the present invention.

FIG. 12 illustrates a configuration of the switch in another exemplary embodiment. Referring to FIG. 12, the switch process 101 (101A-101C) is configured to be executed in an isolated environment 102 (102A-102C). Isolation technology provides a containment environment where a malware can run without affecting an entire system. Any damage done by the malware is contained in an isolated environment. That is, even if a switch process is compromised by a malware, the malware may be confined in the isolated environment 102, and hence it cannot affect other flows.

In the present exemplary embodiment, the hypervisor 110 provides memory isolation, though not limited thereto. A memory region (isolated area) assigned to the switch process 101A in the isolated environment 102A is isolated from other memory regions (isolated areas) assigned to other switch processes 101B and 101C in other isolated environments 102B and 102C and isolated from a memory region assigned to OS/Hypervisor or device driver (not shown), except a shared region shared by the switch processes and OS.

Figure 14A:
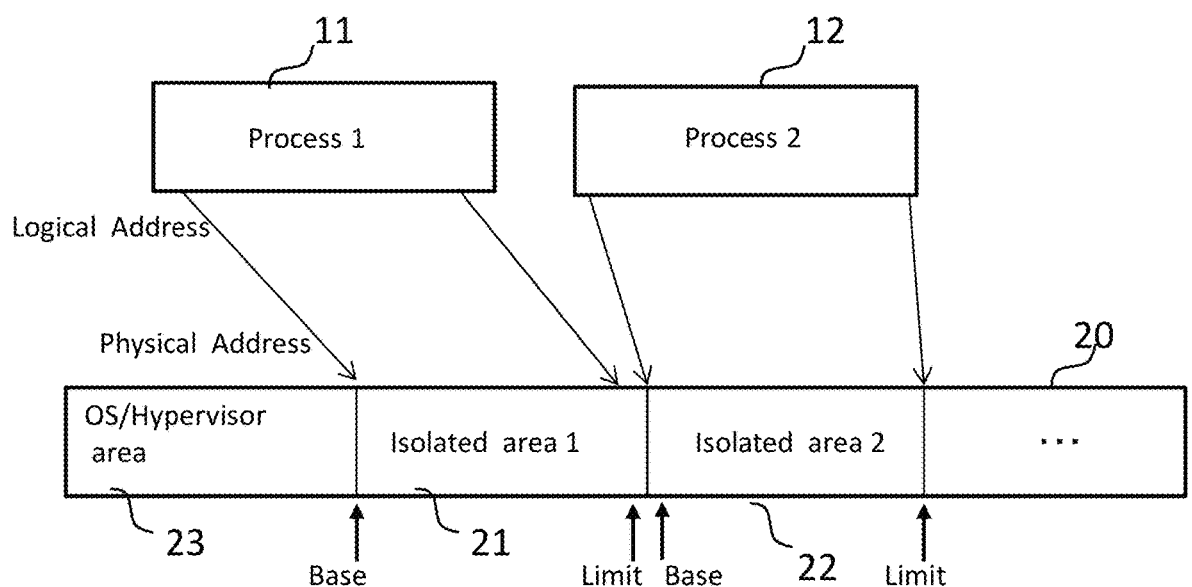
FIG. 14A is a diagram illustrating a memory isolation in the in the exemplary embodiment of the present invention.

FIG. 14A illustrates an example of a hypervisor or hardware based memory protection. As shown in FIG. 14A, isolated areas 1 and 2 (21, 22) allotted to processes 1 and 2 (11, 12) are separate memory regions in a memory 20. An OS/Hypervisor area 23 allotted to OS (Hypervisor) is different from isolated areas 1 and 2 (21, 22) allotted to processes 1 and 2 (11, 12) and hence OS (Hypervisor) is protected from the process (11, 12). Since memory spaces addressed by process (11, 12) are different, each process (11, 12) cannot have an access to an isolated area of the other process.

Though not limited thereto, hypervisor or hardware based MMU (Memory Management Unit) may performs address translation from a logical (virtual) address of each process to a physical address by using a relocation register (no shown) to which a base address of a memory space for the process is set. The base address in the relocation register and the logical address are added to generate the physical address. MMU also checks that the generated physical address is in a range defined by the base address and the limit address of the process. This functions as memory protection mechanism. When MMU detects an occurrence of memory access violation by a fault process, such as, accessing a memory space that the process has no access right, or accessing outside the range defined by the base address and the limit allotted to the process is detected, the fault process may be notified of addressing error by trap, or aborted with notification of addressing error.

Figure 14B:
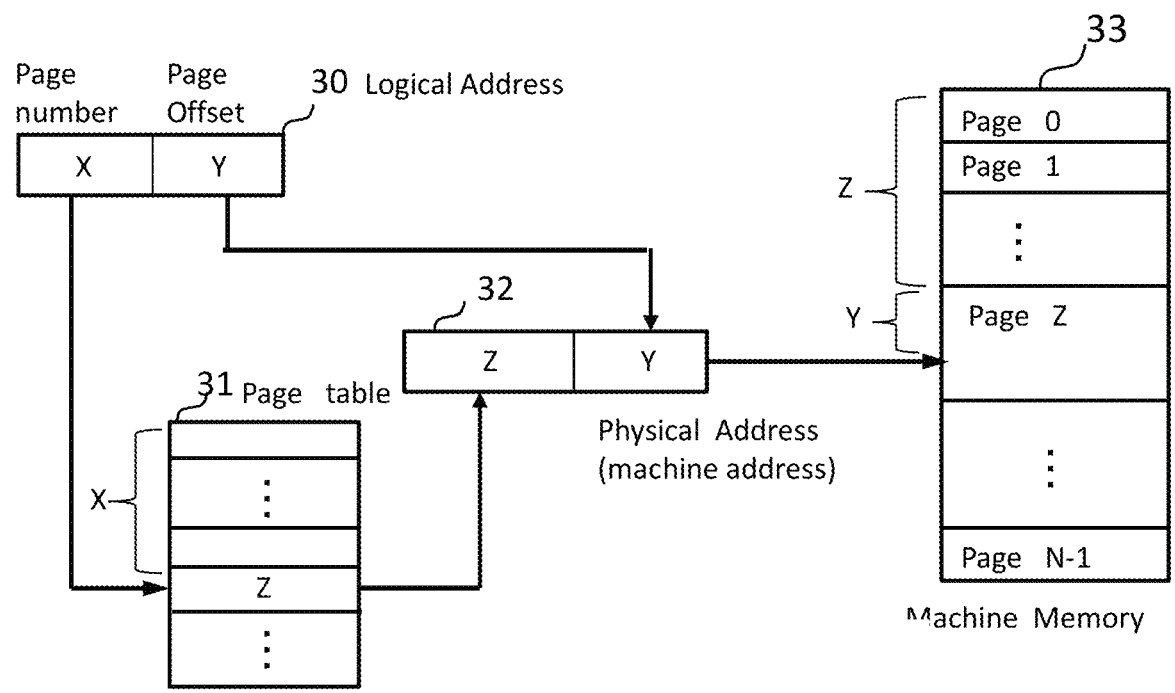
FIG. 14B is a diagram illustrating a paging.

The MMU-based memory protections may be implemented by a page table as illustrated in FIG. 14B. It is noted that MMU is not limited to page based MMU and for example, segment-based memory protection may also be employed.

A page is a fixed-length contiguous block (for example, 4 KB (Kilo Bytes)). A logical address (virtual address) 30 issued from a process includes page number field (n-m bits) and an offset field (m bits). In this case, a page size is $2^m$, where ^ indicates a power operator, and a memory address space for the process is $2^n$. The page number X (upper n-m bits) of the logical address 30 is extracted for supply to a page table 31 as an index (page entry). A value Z (p-bits) stored in the Xth entry of the page table 31 is read out from the page table 31. That is, the page table 31 performs page translation from X to Z. Generally, a bit length p of Z is longer than that of X. Z is combined, as upper bits, with lower m bits Y in the logical address 30 to generate a physical address 32 for supply to a memory (machine memory) 33. In this case, an offset address Y in the Z page in the memory 33 is accessed.

In the exemplary embodiment, the hypervisor 110 may be configured to retain in its own memory region, respective page tables for respective switch processes, thereby preventing any processes from tampering with the page translation.

For a shared memory region that is shared by switch processes, and OS/hypervisor, there may be provided an access controller that controls read/write access from the switch process to the shared region, based on access control information, such that only OS/Hypervisor is allowed to perform write operation to the shared region.

In this example, roll back of each switch process 101 is performed with control by the hypervisor 110, on a per flow (N-flows) basis, as with the aforementioned exemplary embodiments.

The rollback control combined with process isolation can contribute to enhancement of network security. For example, a switch process that gets compromised or corrupted in handling a flow, when handling another flow, may be rolled back to a process image that has not yet undergone contamination or corruption, with the contamination of the switch process being kept confined in the isolated environment, until the roll back is executed, thereby contributing to secure networking.

Figure 13:
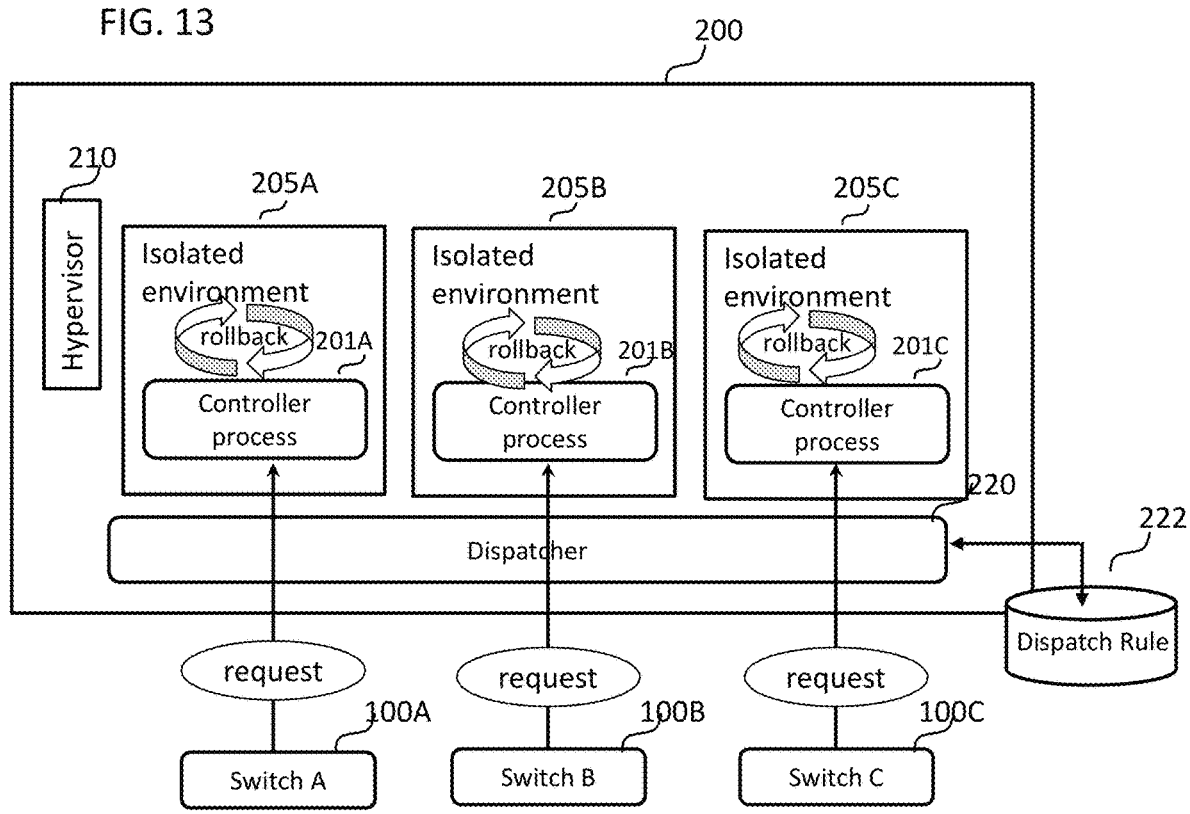
FIG. 13 is a diagram illustrating a configuration of a controller in another exemplary embodiment of the present invention.

FIG. 13 is a diagram illustrating a controller 200 in the exemplary embodiment. Referring to FIG. 13, a hypervisor 210 creates isolated environments 205A-205C and invokes controller processes 201A-201C in isolated environments 205A-205C, respectively. Hypervisor 210 isolates controller processes 201A-201C executed in isolated environments 205A-205C, as with the switch 100.

Dispatcher 220 receives a request (such as Packet-In message) from a switch 100 (or switch process 101) and dispatches the message to an associated controller process 201, based on a dispatch rule stored in a storage 222.

The dispatch rule stored in storage 222 may include a correspondence between a port ID that is connected to a switch and a controller process ID. The correspondence between a port ID connected to a switch and a controller process ID may be determined based on a trust level of the controller process and the switch, such that a message from an untrusted switch process may be dispatched to an untrusted controller process and a message from a trusted switch process may be dispatched to a trusted controller process.

In this example, roll back of each controller process 201 is performed by the control of the hypervisor 210, as with the aforementioned exemplary embodiments.

With roll back of the controller process executed in an isolation environment, a contaminated or corrupted controller process may be rolled back to a process image that has not yet undergone the contamination or corruption, with the contamination in the controller process 201 being kept confined in the isolated environment, until the roll back is executed, thus contributing to enhancement of network security.

Figure 15:
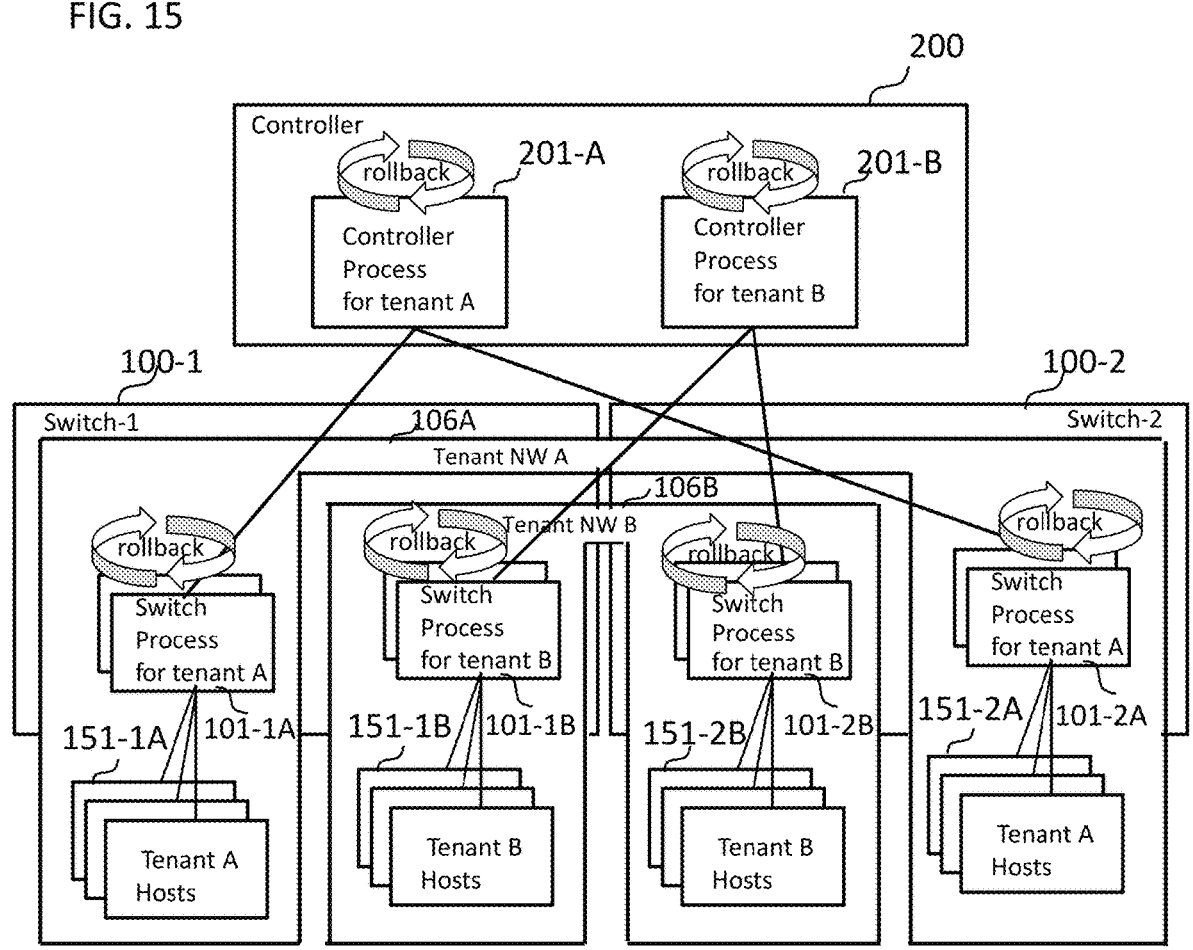
FIG. 15 is a diagram illustrating tenant based network isolation in the exemplary embodiment of the present invention.

FIG. 15 illustrates an example of a data center according to the exemplary embodiment. Controller 200 corresponds to the controller 200 as described with reference to FIG. 5, FIG. 6, or FIG. 13. Switches 100-1 and 100-2 each correspond to the switch 100 as described with reference to FIG. 1 or FIG. 12. Referring to FIG. 15, a tenant based security policy is adopted in a data center network.

Tenant A hosts 151-1A and Tenant A hosts 151-2A are connected respectively to switch processes for tenant A 101-1A in the switch 100-1 and switch processes for tenant A 101-2A in the switch 100-2 to form a tenant network A. The switch processes for tenant A 101-1A in the switch 100-1 and switch processes for tenant A 101-2A in the switch 100-2 are connected to Controller Process for tenant A 201-A.

Tenant B hosts 151-1B and Tenant B hosts 151-2B are connected respectively to switch processes for tenant B 101-1B in the switch 100-1 and switch processes for tenant B 101-2B in the switch 100-2 to form a tenant network B. The switch processes for tenant B 101-1B in the switch 100-1 and switch processes for tenant B 101-2B in the switch 100-2 are connected to Controller Process for tenant B 201-B. With this network configuration, when the tenant network A (B) is compromised, the contamination is confined in the tenant network A (B).

In this example, each of switch processes 101-1A, 101-1B, 101-2A, and 101-2B is rolled back by the control of the hypervisor 110 (see FIG. 1 or FIG. 13, not shown in FIG. 15), as with the aforementioned exemplary embodiments. Roll back of each of the controller processes 201-A, and 201-B is performed by the control of the hypervisor 210 (not shown in FIG. 15), as with the aforementioned exemplary embodiments.

With rollback of the process executed in an isolation environment, contamination in the process may well be confined in the isolated environment until the roll back is executed, and a contaminated or corrupted process may be rolled back to a previous clean process image that has not yet been affected by the contamination or corruption, thus ensuring network security.

Figure 16:
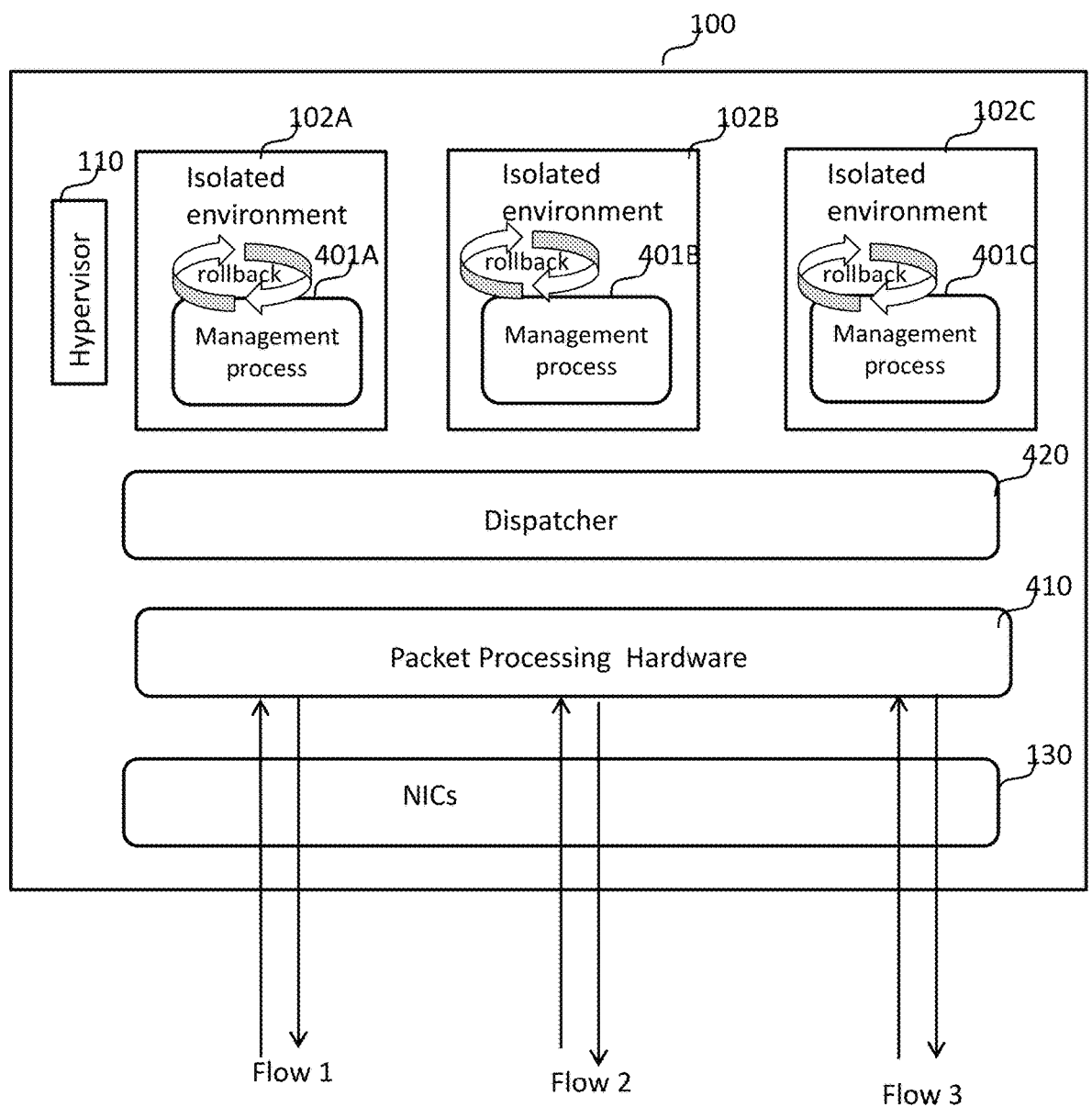
FIG. 16 is a diagram illustrating a variation of a switch in another exemplary embodiment of the present invention.

FIG. 16 illustrates a configuration of a further variation in the exemplary embodiment. Referring to FIG. 16, a dispatcher 420 is deployed between a packet processing hardware 410 and management processes 401A-401C.

In this embodiment, packet processing is performed by the packet processing hardware 410, and management processes 401A-401C communicate with controller processes not shown in FIG. 16, via OpenFlow channels. Each of management processes 401A-401C receives/deletes flow entries to/from the packet processing hardware 410. Then, the packet processing hardware 410 processes respective packets according to the flow entries.

Dispatcher 420 monitors additions and deletions of respective flow entries. When the packet processing hardware 410 receives a packet with which flow entries do not match, the packet processing hardware 410 notifies no-match to the dispatcher 420. Then, the dispatcher 420 transfers the notification to an associated one of the management processes 401A-401C, according to an associated dispatch rule. More specifically, the notification may include packet information such as IP address, MAC (Media Access Control) address and VLAN (Virtual Local Area Network) tag, and the dispatcher 420 compares the packet information and the dispatch rules to find a dispatch rule that matches the header information of the packet, for determining a management process.

Furthermore the dispatcher 420 may be configured to check conflict between one or more flow entries and one or more dispatch rules. More specifically, in the case wherein a management process (e.g., 401A) tries to add a flow entry that conflicts with one or more dispatch rules of one or more other management processes (401B and 401C), the dispatcher 420 denies the flow entry. For example, assuming that a dispatch rule associates VLAN ID 123 with the management process 402B, when the management process 402A tries to input a flow entry whose match filed specifies VLAN ID=123, the dispatcher 420 denies the flow entry. Namely, the dispatcher 420 does not allow the management process 402A to add the flow entry in its flow table.

Figure 17:
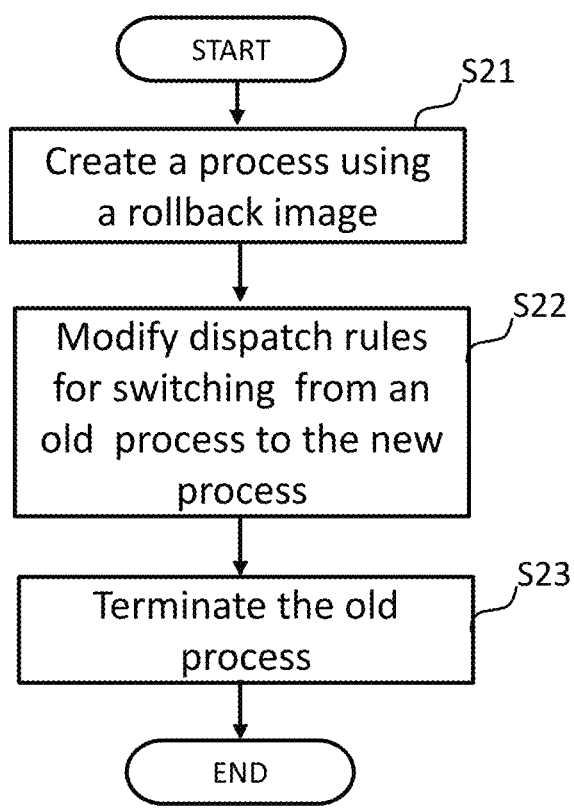
FIG. 17 is a diagram illustrating a procedure of a variation in another exemplary embodiment of the present invention.

FIG. 17 illustrates a variation of rollback procedure in the exemplary embodiment. In this procedure, first the hypervisor (110/210) creates a process (switch process/controller process/management process) using rollback image (S21).

After the creation of the process, the dispatcher (120/220/420) modifies dispatch one or more rules in the dispatch rule table (121) so that the new process (switch process/controller process/management process) can handle requests or packets instead of the old (existing) process (S22). More specifically, a process field in a dispatch rule that defines association of a flow to a process to which the flow is dispatched is changed from the old process to the new process.

Finally, the hypervisor (110/210) terminates the old process (S23).

The roll back procedure above described can contribute to reduction of downtime due to rollback. The reason is that changing dispatch rules (switching from the old process to the new process) is fast as compared with rollback process.

In the above exemplary embodiments, the arrangement in which a process running on a virtual machine is controlled by a hypervisor are described, but the concept of the exemplary embodiments also may be applied to a process running on a processor without hypervisor or without server-virtualization. In the above exemplary embodiments, the arrangement in which a process on a virtual machine is controlled to be executed in an isolated environment by a hypervisor are described, but the concept of the exemplary embodiments also may be applied to a process running on a processor adapted to be able to provide an isolation environment to the process, such as memory isolation without hypervisor.

In the above exemplary embodiments, examples of application to OpenFlow switch and controller are described, but application of the present invention is, as a matter of course, not limited to OpenFlow network.

Each disclosure of the above-listed Non Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

The invention claimed is:
1. A communication apparatus comprising:
a processor;
a memory coupled with the processor and storing a program executable by the processor; and a plurality of network interfaces, each of the network interfaces connected to a network, wherein the processor, based on the program stored in the memory, is configured to execute:
- a plurality of communication processes, each performing communication processing on a flow associated thereto;
- a dispatch process that receives a packet from at least one network interface out of the plurality of the network interfaces, and dispatches the packet to an associated communication process, based on a dispatch rule that defines association of the flow to the associated communication process to which the flow is dispatched; and
- a rollback control process that performs control to roll back each of the communication processes using a saved image thereof, wherein the rollback control process is configured to:
  - save an image of a communication process and an integrity measure thereof;
  - check whether or not a currently calculated integrity measure of the communication process is the same as the integrity measure previously calculated and saved; and
  - rollback the communication process by restoring the image thereof being saved, when the currently calculated integrity measure of the communication process is found to be not the same as the integrity measure of the communication process previously calculated and saved.

2. The communication apparatus according to claim 1, wherein the rollback control process
- saves, on a storage device, a state, execution codes, or, the state and the execution codes, of the communication process, in accordance with a setup, and
- performs roll back by overwriting one of the state, the execution codes, or, the state and the execution codes that are saved, to an existing state, existing execution codes, or, the existing state and the existing execution codes, of the communication process.

3. The communication apparatus according to claim 1, wherein the processor is further configured to execute:
- a hypervisor that controls the communication process, wherein
- the hypervisor executes the rollback control process.

4. The communication apparatus according to claim 1, wherein the rollback control process performs updating of a rollback image of the communication process, wherein responsive to an occurrence of a predetermined event for triggering rollback, the rollback control process performs rollback with a latest roll back image saved.

5. The communication apparatus according to claim 1, wherein the rollback control process creates a communication process using the saved image thereof, and causes the dispatch process to change the communication process, to which the flow is dispatched, in the dispatch rule, from an existing communication process to the created communication process.

6. The communication apparatus according to claim 1, wherein the communication process includes
- a switch process that, upon reception of a packet dispatched thereto by the dispatch process, matches header field information of the packet with a rule for handling the flow, and handles the packet based on the matching result, wherein the rule includes a match field that is matched with header field information of a packet; and an action field that prescribes handling of matching packet,
- wherein the rollback control process controls to perform rollback of the switch process, every time the switch process handling the flow or N number of the flows, wherein N is a predetermined integer number not less than 2, or, responsive to an occurrence of a predetermined event for triggering rollback.

7. The communication apparatus according to claim 1, wherein the communication process includes
- a management process that performs communication with a controller that controls the communication apparatus, the communication apparatus further comprising
- a packet processor performing packet processing according to a rule for handling the flow, wherein the dispatch process monitors the rule for handling the flow.

8. The communication apparatus according to claim 1, wherein the communication process includes
- a controller process that, upon reception of a message from a switch, generates a rule for handling the flow to be applied for each of switches on a path for the flow, the rule including a match field that is matched with header field information of a packet received by the switch, and an action field that prescribes handling of matching packet by the switch, and sends the generated rule to each of switches on the path for the flow, wherein the rollback control process controls to perform rollback of the controller process,
- after the controller process handles a request from the switch,
- after handling one operation,
- periodically, or,
- responsive to an occurrence of a predetermined event for triggering rollback.

9. The communication apparatus according to claim 8, wherein the controller process executes
- a controller core process; and
- an application interface, wherein in the roll back of the communication process, at least one of the controller core process or the application interface is rolled back, or the controller core process and the application interface are separately rolled back.

10. The communication apparatus according to claim 1, wherein the communication process is configured to be executed in an environment allocated thereto, the environment arranged for each of the communication processes being isolated from each of one or more environments arranged for remaining one or more communication processes.

11. The communication apparatus according to claim 1, wherein the communication apparatus is a switch apparatus comprising, as the plurality of the communication processes,
- a plurality of switch processes, each of the switch processes performing switch processing on the flow associated thereto.

12. The communication apparatus according to claim 1, wherein the communication apparatus is a controller apparatus comprising, as the plurality of the communication processes,
- a plurality of controller processes, each of the controller processes performing control of one or more associated switch processes, wherein the dispatch process dispatches a message from a switch to an associated controller process, based on a dispatch rule that defines association of the switch to the controller process to which a message from the switch is dispatched.

13. A communication system comprising:
a switch; and
a controller to control the switch, wherein
the switch comprises:
a processor;
a memory coupled with the processor and storing a program executable by the processor; and
a plurality of network interfaces, each of the network interfaces connected to a network, wherein the processor, based on the program store in the memory, is configured to execute:
a plurality of switch processes, each of the switch processes performing switch processing on a flow associated thereto;
a dispatch process that receives a packet from at least one network interface out of the plurality of the network interfaces and dispatches the packet to an associated switch process, based on a dispatch rule that defines association of the flow to the associated switch process to which the flow is dispatched; and
a rollback control process that performs control to roll back each of the switch processes using a saved image thereof, wherein the rollback control process is configured to:
save an image of a switch process and an integrity measure thereof;
check whether or not currently calculated integrity measure of the switch process is the same as integrity measure previously calculated and saved; and
rollback the switch process by restoring the image thereof being saved, when the currently calculated integrity measure of the switch process is found to be not the same as the integrity measure of the switch process previously calculated and saved.

14. The communication system according to claim 13, wherein the rollback control process controls to perform rollback of the switch process every time the switch process handling the flow or N number of the flows, wherein N is a predetermined integer number not less than 2, or, responsive to an occurrence of a predetermined event for triggering rollback.

15. The communication system according to claim 13, wherein, the processor in the switch, when a dispatch rule for the flow indicated by header field information of a packet received from the network interface is not present, sends a query for a dispatch rule for the flow to the controller, and
on receipt of the dispatch rule for the flow sent from the controller, the processor invokes a switch process associated with the flow if the invocation necessary, and sends a response to the controller, wherein
the switch process, upon reception of a rule for the flow from the controller, handles one or more packets associated with the flow, based on the rule.

16. The communication system according to claim 13, wherein the controller comprises:
a processor;
a memory coupled with the processor and storing a program executable by the processor, and
a plurality of network interfaces, each of the network interfaces connected to a network, wherein the processor included in the controller, based on the program stored in the memory included in the controller, is configured to execute:
a plurality of controller processes, each of the controller processes performing control of one or more associated switch processes;
a first dispatch process that dispatches a message from a switch process to an associated controller process, based on a first dispatch rule that defines association of a switch process to a controller process to which a message from the switch process is dispatched; and
a rollback control process that controls to perform rollback of each of the controller processes using a saved image thereof.

17. The communication system according to claim 16, wherein the rollback control process executed by the processor included in the controller controls to perform rollback of the controller process,
after the controller process handles a request from the switch,
after handling one operation,
periodically, or,
responsive to an occurrence of a predetermined event for triggering rollback.

18. The communication system according to claim 16, wherein the processor included in the controller is configured to execute
a second dispatch process that dispatches a message from an application or more upper layer to a controller process, based on a second dispatch rule that defines association of an application to a controller process to which a message from the application is dispatched, wherein
the controller process performs:
a core process;
a first interface interfacing the first dispatch process to receive a request from the first dispatch process for supply to the core process; and
a second interface interfacing the second dispatch process to receive a request from the second dispatch process for supply to the core process, wherein
the rollback control process executed by the processor included in the controller rolls back at least one of the first and second interfaces or the core process, or the control unit rolls back the first and second interfaces or the core process separately.

19. The communication system according to claim 16, wherein at least one of the switch process included in the switch and the controller process included in the controller is configured to be executed in an environment allocated thereto, the environment arranged for each of the processes being isolated from each of one or more environments arranged for remaining one or more processes.

20. A communication method comprising:
dispatching a packet received by a switch to an associated switch process included in the switch, based on a dispatch rule that defines association of a flow to the associated switch process to which the flow is dispatched;
the associated switch process performing switch processing on the flow associated thereto; and
performing rollback control to roll back the switch processes using a saved image thereof, wherein the rollback control includes:
saving an image of a switch process and an integrity measure thereof;
checking whether or not a currently calculated integrity measure of the switch process is the same as the integrity measure previously calculated and saved; and
rolling back the switch process by restoring the image thereof being saved, when the currently calculated integrity measure of the switch process is found to be not the same as the integrity measure of the switch process previously calculated and saved.

21. A non-transitory computer-readable recording medium storing therein a program to be executed by a computer, the program causing the computer to execute processes comprising:

a plurality of communication processes, each of the communication processes performing communication processing on a flow associated thereto;

a dispatching process that receives a packet from a network interface and dispatches the packet to an associated communication process, based on a dispatch rule that defines association of the flow to the associated communication process to which the flow is dispatched; and a rollback control process that performs rollback of each of the communication processes using a saved image thereof wherein the rollback control process includes:

saving an image of a communication process and an integrity measure thereof;

checking whether or not a currently calculated integrity measure of the communication process is the same as the integrity measure previously calculated and saved; and rolling back the communication process by restoring the image thereof being saved, when the currently calculated integrity measure of the communication process is found to be not the same as the integrity measure of the communication process previously calculated and saved.

* * * * *